(12) United States Patent
Coquel et al.

(10) Patent No.: US 10,759,094 B2
(45) Date of Patent: Sep. 1, 2020

(54) THERMAL HEATING DEVICE USING LIGHT FOR BINDER ACTIVATION AND ITS INTEGRATION IN PREFORMING DEVICE

(71) Applicant: Airbus Defence and Space GmbH, Taufkirchen (DE)

(72) Inventors: Maxime Coquel, Munich (DE); Wolfgang Rehm, Hergensweiler (DE); Michael Träger, Wetzikon (CH)

(73) Assignee: Airbus Defence and Space GmbH, Taufkirchen (DE)

( * ) Notice: Subject to any disclaimer, the term of this patent is extended or adjusted under 35 U.S.C. 154(b) by 360 days.

(21) Appl. No.: 15/368,270

(22) Filed: Dec. 2, 2016

(65) Prior Publication Data
US 2017/0144333 A1 May 25, 2017

Related U.S. Application Data

(63) Continuation of application No. PCT/EP2015/001108, filed on Jun. 1, 2015.

(30) Foreign Application Priority Data

Jun. 6, 2014 (EP) .................... 14001963

(51) Int. Cl.
*B29C 35/08* (2006.01)
*B29C 70/38* (2006.01)
(Continued)

(52) U.S. Cl.
CPC .......... *B29C 35/0805* (2013.01); *B29C 70/38* (2013.01); *G02B 19/0009* (2013.01);
(Continued)

(58) Field of Classification Search
None
See application file for complete search history.

(56) References Cited

U.S. PATENT DOCUMENTS 4,252,592 A 2/1981 Green
5,059,008 A 10/1991 Flood et al.
(Continued)

FOREIGN PATENT DOCUMENTS

CN 103071928 A 5/2013
CN 103660310 A 3/2014
(Continued)

OTHER PUBLICATIONS

WO2007/013543 Google Patents Machine Translation Performed on Nov. 1, 2018. (Year: 2018).*
(Continued)

*Primary Examiner* — Lisa L Herring
(74) *Attorney, Agent, or Firm* — Jenkins, Wilson, Taylor & Hunt, P.A.

(57) ABSTRACT

A binder material activating device to activate a binder material on a fibrous substrate, the binder material activating device including a heat exposing device to expose the fibrous substrate with the binder material to heat. The heat exposing device includes a non-focused light source to provide a non-focused light beam and an optics device to be arranged in between the fibrous substrate to be exposed to heat and the light source to focus the non-focused light beam onto the fibrous substrate. Further, a preforming device includes the binder material activating device.

20 Claims, 12 Drawing Sheets

(51) Int. Cl.
*G02B 27/09* (2006.01)
*G02B 19/00* (2006.01)

(52) U.S. Cl.
CPC ..... *G02B 19/0014* (2013.01); *G02B 19/0066* (2013.01); *G02B 27/0905* (2013.01); *G02B 27/0955* (2013.01)

(56) References Cited

U.S. PATENT DOCUMENTS

| | | | | |
|---|---|---|---|---|
| 5,471,236 | A * | 11/1995 | Ito | B41J 2/473 347/233 |
| 6,451,152 | B1 | 9/2002 | Holmes et al. | |
| 8,191,215 | B2 | 6/2012 | Meyer | |
| 8,567,469 | B2 | 10/2013 | Meyer et al. | |
| 8,568,549 | B2 | 10/2013 | Meyer et al. | |
| 2006/0048881 | A1 | 3/2006 | Evans et al. | |
| 2007/0275344 | A1* | 11/2007 | Liu | A61C 19/004 433/29 |
| 2008/0085335 | A1 | 4/2008 | Soccard | |
| 2014/0238970 | A1* | 8/2014 | Johnson | H01L 21/67115 219/409 |
| 2015/0083933 | A1* | 3/2015 | Eliason | H01L 33/06 250/459.1 |
| 2016/0091784 | A1* | 3/2016 | Hu | G03B 21/2013 353/102 |
| 2016/0179018 | A1* | 6/2016 | Holzmann | G03F 7/70308 355/30 |
| 2017/0151731 | A1* | 6/2017 | Ho Yew Chi | B29C 70/38 |

FOREIGN PATENT DOCUMENTS

| | | |
|---|---|---|
| DE | 4041542 A1 | 6/1992 |
| DE | 10 2007 012 607 A1 | 9/2008 |
| DE | 10 2007 012 609 A1 | 9/2008 |
| DE | 10 2007 012 608 A1 | 10/2008 |
| DE | 10 2008 012 255 A1 | 9/2009 |
| JP | H05-269738 A | 10/1993 |
| JP | 2005-203481 A | 7/2005 |
| JP | 2006-216800 A | 8/2006 |
| JP | 2014-094464 A | 5/2014 |
| WO | WO 2007/013543 A1 | 2/2007 |
| WO | WO 2009/115598 A1 | 9/2009 |

OTHER PUBLICATIONS

WO2007/013543A1 English Translation Performed by Schreiber Translations, Nov. 2018. (Year: 2018).*
Mack, et al.. "Filament Winding Process in Thernnopalstics", Manufacturing Techniques for Polymer Matrix Composites (PMCs), a volume in Woodhead Publishing Series in Composites Science and Engineering, 2012, pp. 182-208. (Year: 2012).*
Extended European Search Report for Application No. 14001963.9 dated Dec. 3, 2014.
Chinese Office Action for Application No. 201580030181.5 dated May 29, 2018.
International Search Report and Written Opinion for Application No. PCT/EP2015/001108 dated Mar. 3, 2016.
Search Report for Japanese Application No. 2016-571204 dated Jan. 9, 2019.
Japanese Office Action for Application No. 2016-571204 dated Jan. 29, 2019.

* cited by examiner

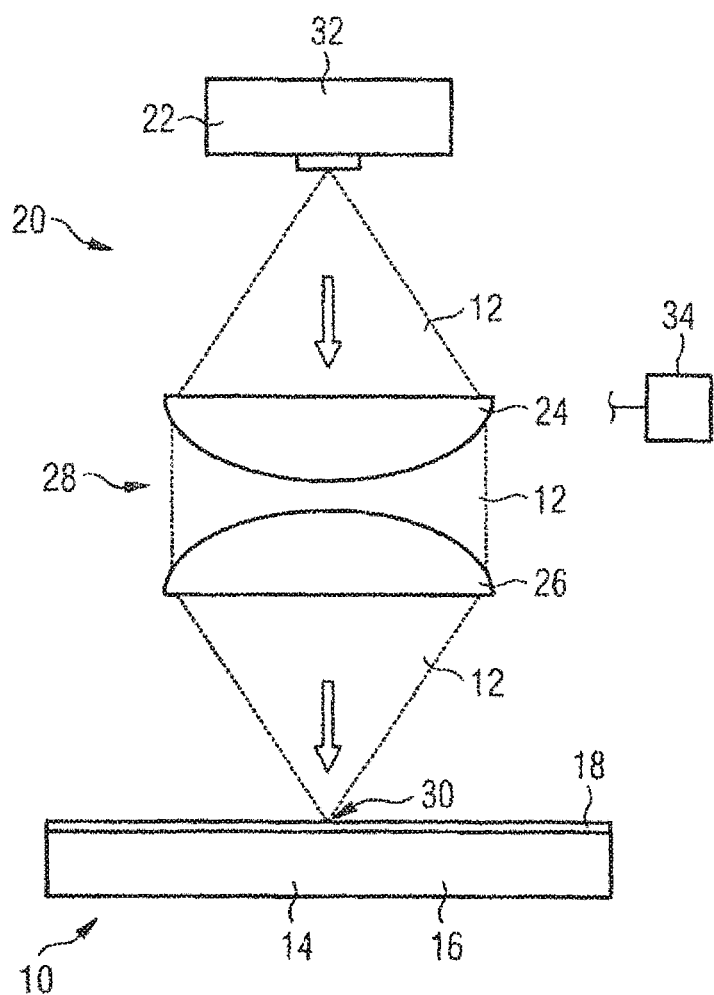

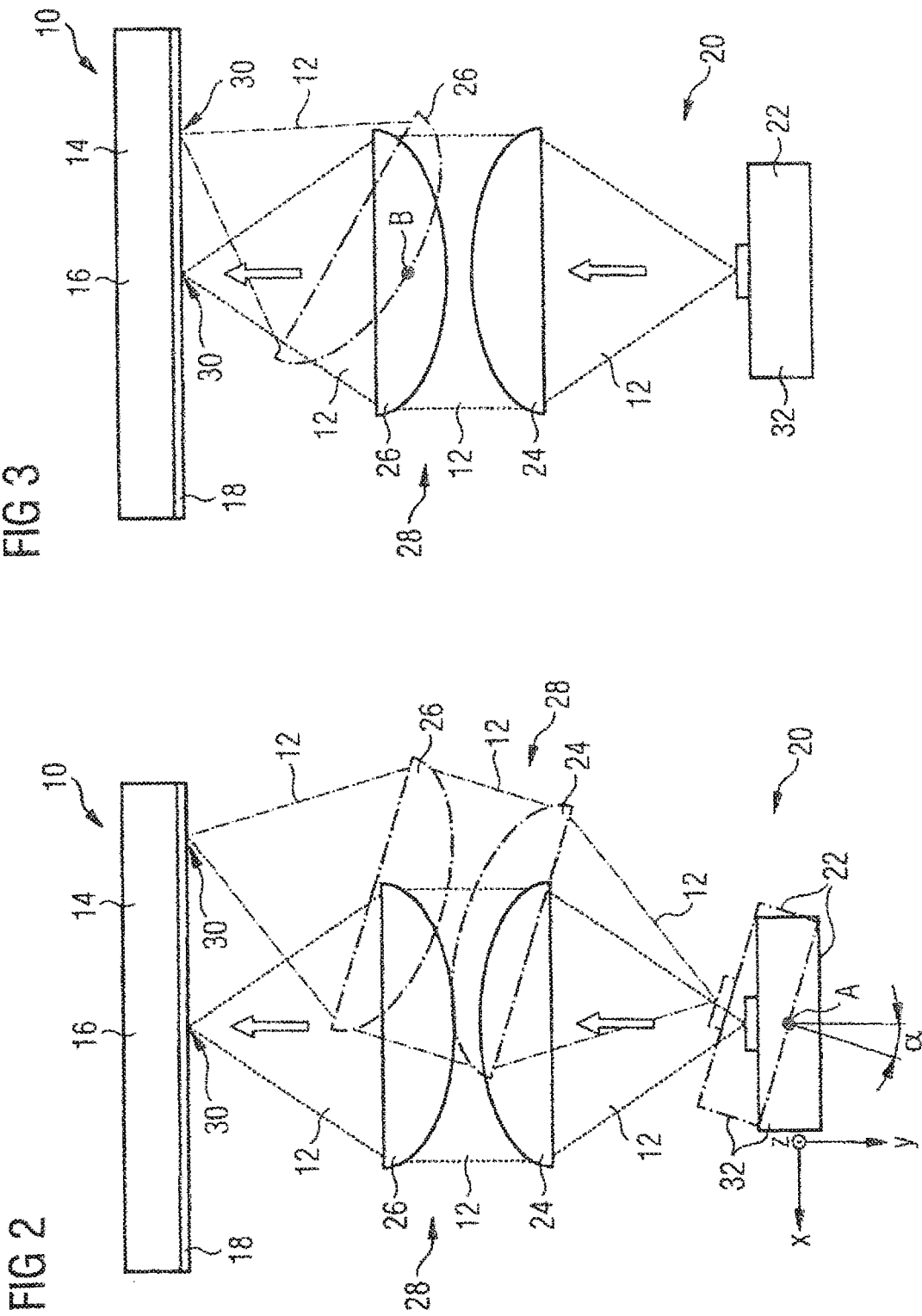

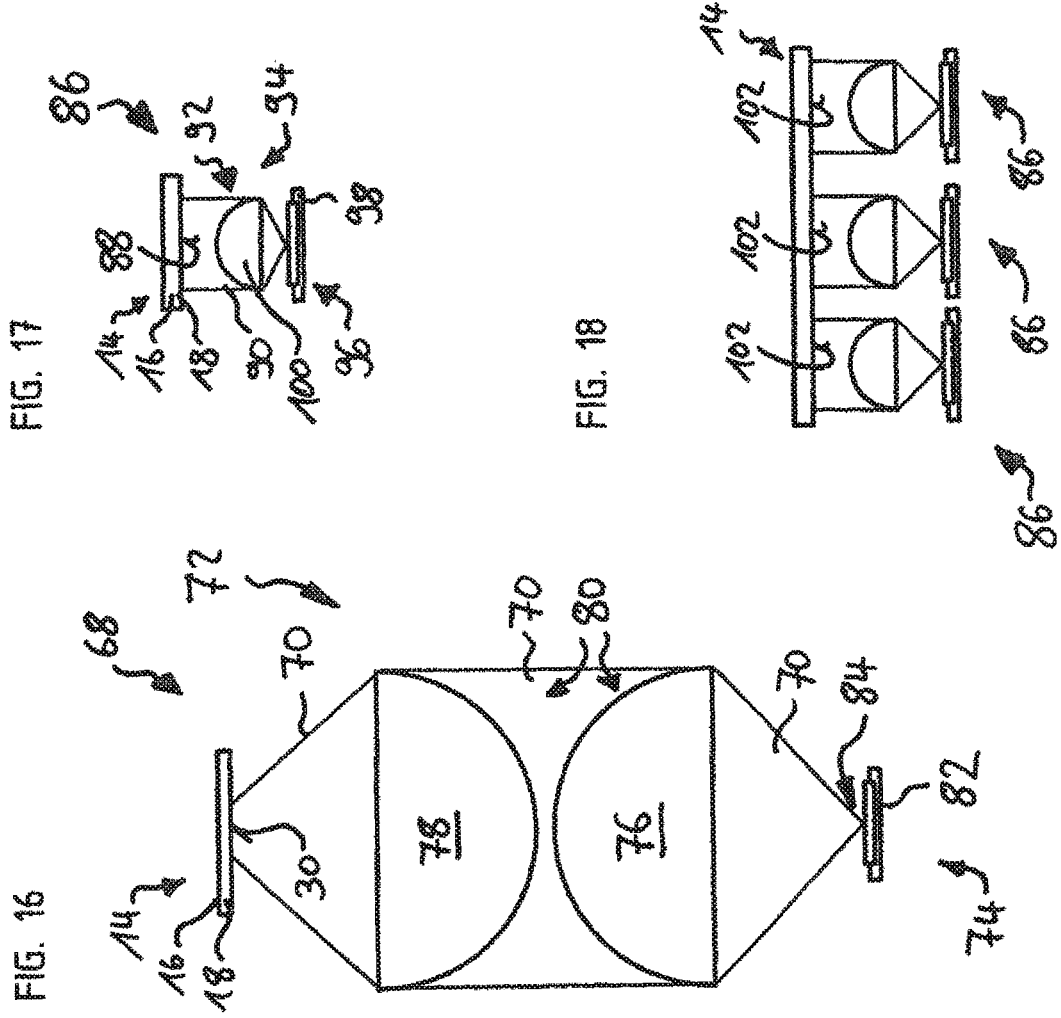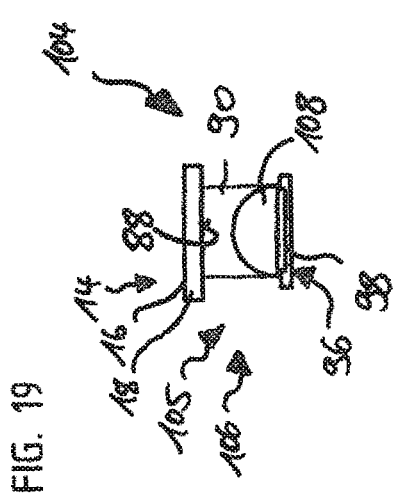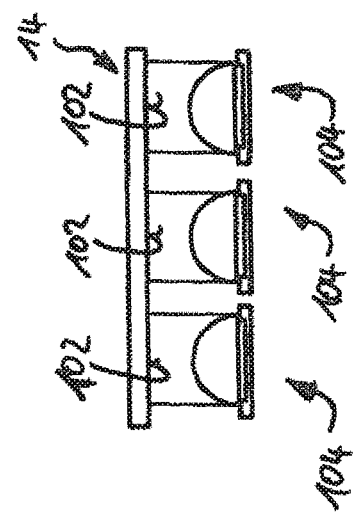

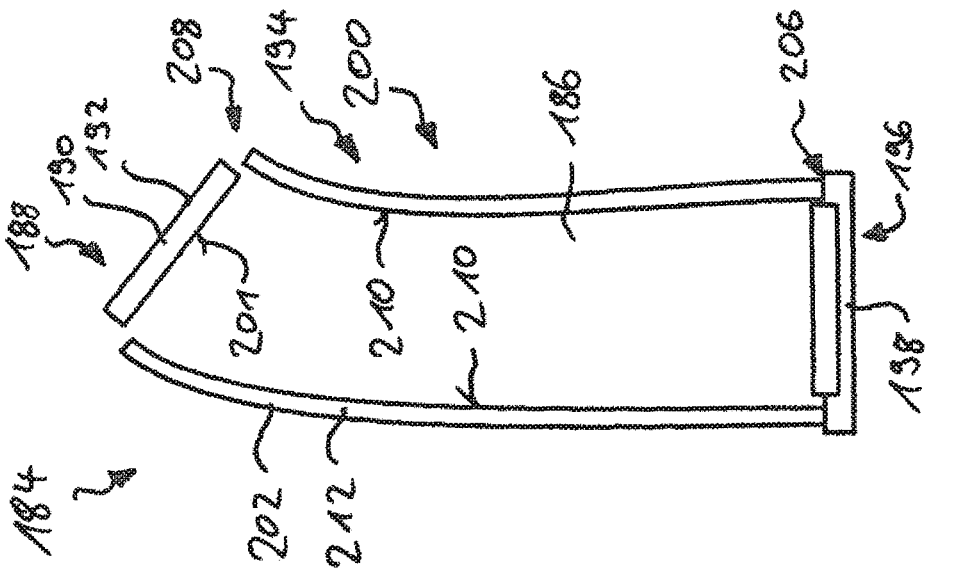

THERMAL HEATING DEVICE USING LIGHT FOR BINDER ACTIVATION AND ITS INTEGRATION IN PREFORMING DEVICE

CROSS-REFERENCE TO RELATED APPLICATIONS

This application is a continuation of and claims priority to PCT/EP2015/001108 filed Jun. 1, 2015 which claims the benefit of and priority to European patent application No. 14 001 963.9 filed Jun. 6, 2014, the entire disclosures of which are incorporated by reference herein.

TECHNICAL FIELD

The disclosure herein relates to a binder material activating device to active a binder material on a fibrous substrate and to a preforming device to attach a fibrous substrate to a substrate using the binder material activating device.

BACKGROUND

In DE 10 2007 012 608 A1 and DE 10 2008 012 255 A1 a device for manufacturing a preform for a load path aligned composite structure is described. DE 10 2007 012 607 A1 and WO 2009/115598 A1 describe single elements of this preform manufacturing device, in particular a spreading device to spread out the fibers of the fiber patches, and a cutting device to cut a fiber band into the single patches.

In these devices small fiber patches are provided with a binder material and then transferred to a preforming substrate. Before transferral, during transferral or after being laid down onto the preforming substrate the binder material is activated, for example by a resistance heater in a laying head which transfers the fiber patches onto the preforming substrate. Such a laying head is for example described in DE 10 2007 012 609 A1.

To transfer the heat generated by the resistance heater in the laying head to the single patches, a contact between the head and the patches is necessary. This results in the need to provide a laying head which is able to lay down the patches with the activated binder material without resulting in residues of the binder material on the surface of the laying head.

An alternative to the above described resistance heater can for example be a laser arrangement as a heating device that introduce heat directly on the substrate surface to be bonded. Unfortunately, laser arrangements are relatively expensive and can involve help or safety issues, in particular if the laser beam as a focused light-source impinges the eye of the user. Therefore, a laser arrangement is a possible alternative which has the disadvantage that it can be quite elaborate.

SUMMARY

Therefore, it is an object of the disclosure herein to provide a further heating alternative to activate the binder material on the fiber patches or on fibrous substrates in general.

This object is achieved for example by a binder material activating device and a preforming device as disclosed herein.

By the term "binder material" all materials are covered which can be activated in any form by the introduction of heat. For example it is possible to use thermoplastic materials which melt during the introduction of heat and therefore bind the fibers of a fibrous substrate together. Further, it is also possible to use thermoset resins which cure to a matrix when impinged with heating energy. The binder material can be a dry or a liquid material and it can be attached to the fibrous substrate in form of a film, a powder or a veil. The binder material can form a single layer on top of the surface of a fibrous substrate or alternatively the binder material can surround each single fiber in the fibrous substrate in the manner of a matrix being impregnated in the fibers.

By the term "fibrous substrate" all substrates should be understood which comprise fibers, for example strands of single fibers, spread-out fibers of a fiber strand, fiber patches and also fabrics formed by stitching, braiding, knitting or weaving.

A binder material activating device to activate a binder material on a fibrous substrate comprises a heat exposing device to expose the fibrous substrate which comprises the binder material to heat. The heat exposing device comprises a non-focused light source to provide a non-focused light beam and further an optics device to be arranged in between the fibrous substrate to be exposed to heat and the light source in order to focus the non-focused light beam onto the substrate.

Hence, instead of using a laser arrangement, it is proposed to use a divergent light source, which light sources are relatively cheap to purchase and do not involve help or safety issues, and to focus the divergent light beam emitted from the divergent light source onto the fibrous substrate, and/or to homogeneously expose the substrate to the light beam. The energy of the light beam is focussed to the surface of the fibrous substrate to activate the binder material. Alternatively or additionally the light beam homogeneously exposes the surface of the fibrous material which allows for a homogeneous binding of the fibres thereby improving stability. In both cases the energy in the bundle is high enough to activate the binder material.

In a preferred embodiment the non-focused light source is an LED. LEDs are relatively cheap and are preferably easy to handle. Further, they preferably have a high efficiency factor compared to other non-focused light sources. Additionally, they can advantageously be purchased with different wavelength i.e. colour emissions.

In a preferred embodiment the light source comprises an emitting wavelength which lies in the non-visible spectrum. Therefore, advantageously no provisions regarding safety issues due to light particles in the visible spectrum have to be arranged.

In particular the light source comprises an emitting wavelength which corresponds to an absorption domain of the binder material or the fiber substrate which is to be activated by the light beam. Alternatively or additionally the emitting wavelength of the light source corresponds to a heating energy which is needed to heat at least one fiber in the fibrous substrate to a melting/activating temperature of the binder material.

In a further preferred embodiment the heat exposing device is movable in at least one spatial direction. Alternatively or additionally the heat exposing device is pivotable about at least one axis being perpendicular to the light beam. With such arrangements the light beam of the heat exposing device can be advantageously directed to special predefined areas on the fibrous substrate and therefore selective activation of the binder material on the fibrous substrate is preferably possible.

In a preferred embodiment the optics device comprises a collimating lens to collimate the non-focused light beam and further a focusing lens to focus the collimated light beam onto the fibrous substrate. With such an arrangement the energy which can be yielded on the surface of the fibrous substrate out of the light beam emitted from the light source can preferably be maximised.

In a preferred embodiment the focusing lens is movable, in particular pivotable about at least one axis being perpendicular to the light beam. Therefore, it is advantageously possible to scan the surface of the fibrous substrate with the light beam by moving only the focusing lens instead of the overall heat exposing device.

In a preferred embodiment the binder material activating device comprises a control device which controls the emission power and/or the emission wavelength of the light source. Additionally or alternatively the control device can also control the position and/or the orientation of the overall heat exposing device or the optics device. Therefore, the control device is preferably also able to control the functions of the collimating lens and the focusing lens.

In a preferred embodiment the binder material activating device comprises a plurality of juxtaposed heat exposing devices. With this arrangement it is preferably possible to impinge a larger surface of the fibrous substrate with the light beam as using only one heat exposing device.

Alternatively or additionally it is also possible that the binder material activating device comprises at least one heat exposing device which comprises a plurality of light sources, wherein one single collimation lens extends over the plurality of light sources. With such an arrangement one single collimating lens—and in a preferred embodiment also one single focusing lens extending over the same width as the collimating lens—catches advantageously the light beams of a plurality of juxtaposed light sources and collimates the single light beams to one large collimated light beam which is then focused on a large surface of the fibrous substrate.

In a preferred embodiment it is possible that the single light sources of the plurality of light sources or alternatively the plurality of juxtaposed heat exposing devices emit light beams with different wavelengths and/or different power. If for example a fibrous substrate is used which comprises materials with differing absorption spectra, the wavelengths of the light sources can be selected to be absorbed from only one of the material and to only activate this specific material.

A preforming device to attach a fibrous substrate to a preforming substrate comprises a laying device to lay the fibrous substrate to the preforming substrate and further a binder material activating device as described above.

In a further preferred embodiment the preforming device additionally comprises a binder material deposition device to deposit a binder material onto the fibrous substrate, in particular before activating the binder material by the binder material activating device.

In one preferred embodiment the laying device comprises a laying head to transfer the fibrous substrate from a first position which is located outside the performing substrate to a second position on the surface of the performing substrate, wherein the binder material activating device is arranged at or around the first position. With such an arrangement the binder material can be activated for example before being picked up by the laying device or during transport from the first position to the second position by the laying device.

Alternatively, the binder material activating device can also be located at or around the second position to activate the binder material when the fibrous substrate is laid down onto the preforming substrate.

In a further preferred embodiment the binder material activating device of the preforming device can also be arranged such that it impinges the fibrous substrate with the focus light beam in the very moment the fibrous substrate comes in contact with the preforming substrate.

For example, in a preferred embodiment the laying device comprises a roller to continuously press a sheet of the fibrous substrate to the preforming substrate, wherein the binder material activating device is arranged to impinge the fibrous substrate and/or the preforming substrate with the focused light beam at a contact point of the fibrous substrate and/or a preforming substrate.

For example the binder material activating device is located behind the contact point in the rolling direction and emits the light beam such that it impinges the area between the roller and the preforming substrate where the fibrous substrate is supplied to.

Alternatively or additionally the preforming substrate is a mandrel onto which the fibrous substrate is wound. In this case it can be advantageous if the binder material activating device is arranged to tangentially impinge the focused light beam onto the fibrous substrate in order to merge to subsequent layers of the fibrous substrate being wound onto the mandrel.

Therefore, the binder material activating device as described above is used in a preforming device to activate a binder material on a fibrous substrate.

Further, the binder material activating device can be used to merge fibrous tapes or fibrous sheets activating the binder material in the merging region of juxtaposed tapes or sheets for example by melting. In a further alternative, the binder material activating device can also be used to separate a sheet or patch into several fibrous tapes by melting the binder material and producing a slit on the sheet.

BRIEF DESCRIPTION OF THE DRAWINGS

Embodiments of the disclosure herein will be described in more detail by way of the attached drawings wherein it is shown by:

FIG. 1 illustrates a binder material activating device activating a binder material on a fibrous substrate;

FIG. 2 illustrates the binder material activating device of FIG. 1 being pivotable about an axis A;

FIG. 3 illustrates the binder material activating device of FIG. 1 and FIG. 2 comprising a focusing lens being pivotable about an axis B;

FIG. 16 illustrates a further embodiment of a binder material activating device activating binder material on a fibrous substrate;

FIG. 17 illustrates a further embodiment of a binder material activating device with one collimating lens;

FIG. 18 illustrates an arrangement of a plurality of juxtaposed light sources with one collimating lens, each;

FIG. 19 illustrates a further embodiment of a binder material activating device with an integrated collimating lens;

FIG. 20 illustrates an arrangement of a plurality of juxtaposed light sources with one integrated collimating lens, each;

FIG. 24 illustrates a further embodiment of a binder material activating device without lenses;

FIG. 25 illustrates a modification of the binder material activating device of FIG. 24.

DETAILED DESCRIPTION

Figure 4:
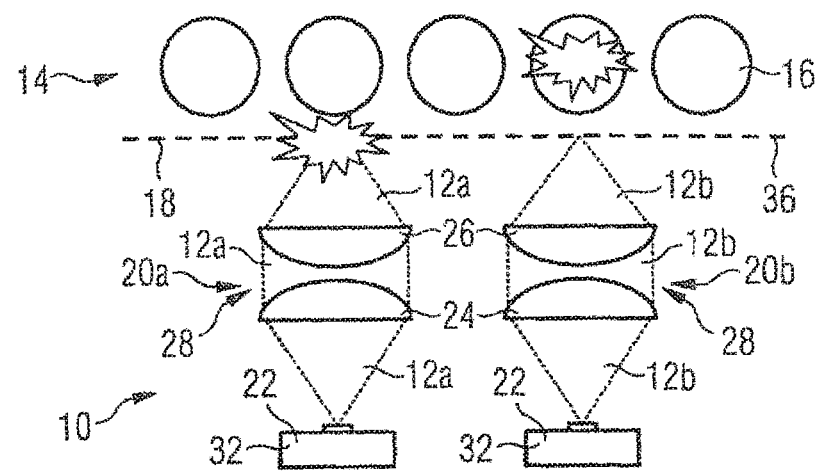
FIG. 4 illustrates an arrangement of two juxtaposed heat exposing devices emitting light beams with different wavelengths.

FIG. 1 shows a binder material activating device 10 which focuses a light beam 12 onto a fibrous substrate 14, for example a fiber 16 coated with binder material 18.

The binder material activating device 10 comprises a heat exposing device 20 with a non-focused light source 22, a collimating lens 24 and a focusing lens 26. The collimating lens 24 and the focusing lens 26 together constitute an optics device 28 with which the non-focused beam 12 is first collimated and then focused onto a predefined area 30 of the fibrous substrate 14.

The light source 22 in FIG. 1 is a LED 32.

The LED 32 emits a non-focused light beam 12 which is collimated by the collimating lens 24. Then the collimated light beam 12 is focused by the focusing lens 26 onto the predefined area 30 where due to focusing of the light beam 12 an energy density is attained which is high enough to activate the binder material 18 on the fibrous substrate 14. The LED 32 emits in a preferred embodiment a light beam 12 with a wavelength which corresponds to the activation energy needed to activate the binder material 18.

Further, the binder material activating device 10 comprises a control device 34 to control the functions of the light source 22 as well as of the optics device 28, in particular of the focusing lens 26.

As shown in FIG. 2, it is possible to arrange the heat exposing device 20 such that it is movable in at least one spatial direction, for example the x-direction shown in FIG. 2. It is more preferred if the heat exposing device 20 is movable in all three spatial directions x, y and z such that a larger area 30 can be impinged by one single heat exposing device 20.

As shown in FIG. 2, it is advantageous if the heat exposing device 20 as a whole is pivotable about an axis A for the same reason.

Alternatively or additionally, as shown in FIG. 3, the focusing lens 26 can also be pivotable about an axis B.

The control device 34 is arranged to control not only the emission power and emission wavelength of LED 32, but also the position of the heat exposing device 20 in the spatial directions x, y and z and about axis A, and further the position of the focusing lens 26 about axis B.

FIG. 4 shows a binder material activating device 10 with two juxtaposed heat exposing devices 20 which emit light beams 12 having differing wavelengths. The light beams 12 impinge a fibrous substrate 14 comprising a plurality of fibers 16 and a layer 36 of a binder material (typically this is a layer in form of a veil) 18 on top of the fibers 16. The light beam 12a of first heat exposing device 20a comprises a wavelength corresponding to an activation energy of the binder material 18 and is therefore absorbed by the binder material 18. Different to this the light beam 12b of a second heat exposing device 20b comprises a wavelength which permeates the binder material 18 without activating the binder material 18 and which is absorbed by one of the fibers 16. Therefore, the second light beam 12b heats the fiber 16.

Figure 5:
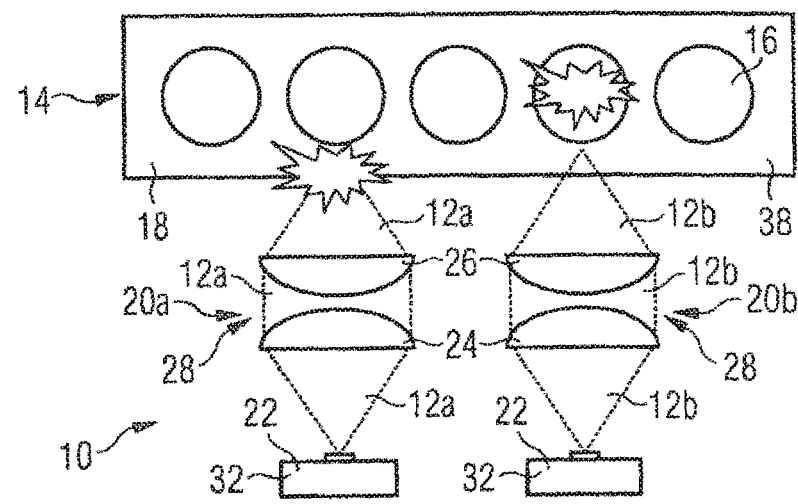
FIG. 5 illustrates an arrangement of two juxtaposed heat exposing devices emitting light beams with different wavelengths.

A similar arrangement is shown in FIG. 5, where the binder material 18 is not arranged as a layer 36 on top of the surface of a fibrous substrate 14, but is impregnated in between the fibers 16 in form of a matrix 38. Also here, a light beam 12a of the first heat exposing device 20a is absorbed by the matrix 28, whereas the light beam 12b of the second heat exposing device 20b is absorbed by a fiber 16.

Figure 6:
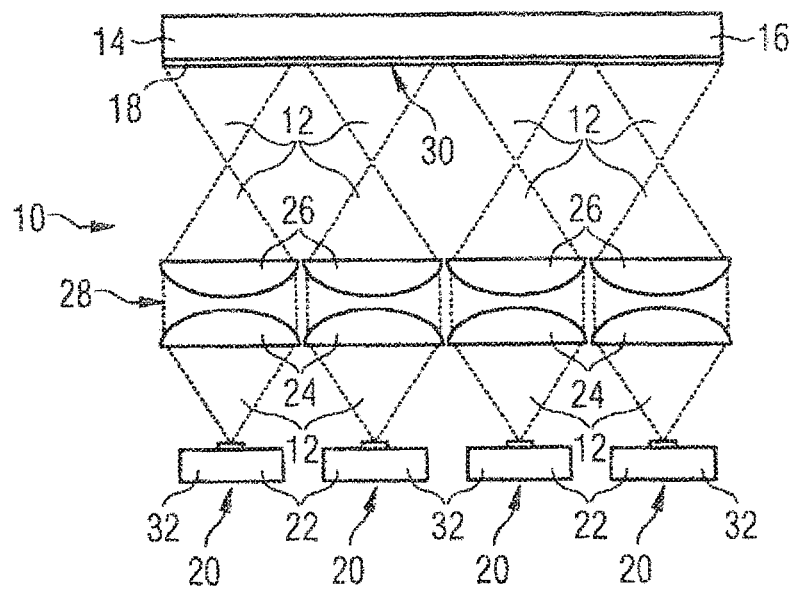
FIG. 6 illustrates a plurality of juxtaposed heat exposing devices emitting light beams onto continuously arranged areas of a fibrous substrate.

FIG. 6 shows a binder material activating device 10 with a plurality of juxtaposed heat exposing devices 20 all emitting light beams 12 in order to impinge a continuous large area 30 of the fibrous substrate 14 with the light beams 12.

Figure 7:
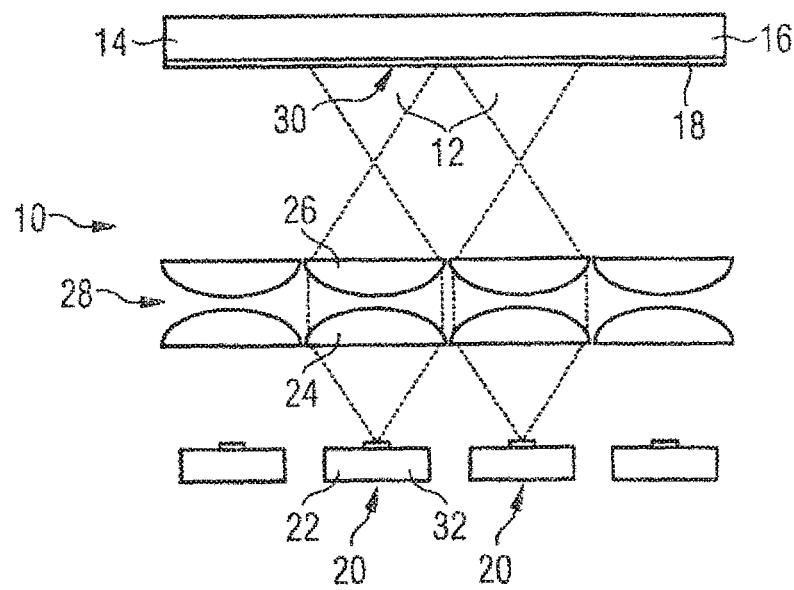
FIG. 7 illustrates the heat exposing devices of FIG. 6 partly being activated.
Figure 8:
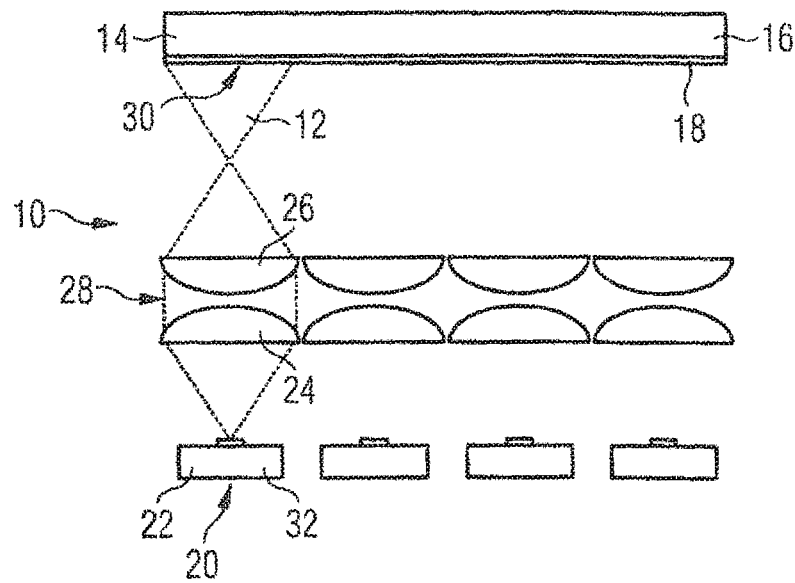
FIG. 8 illustrates the heat exposing devices of FIG. 6 and FIG. 7 with another heat exposing device being activated.

In FIG. 7 the two outermost heat exposing devices 20 of FIG. 6 are deactivated such that only the middle part of the large area 30 shown in FIG. 6 is exposed to the light beams 12. Therefore, only a predefined part of area 30 is selectively impinged by light beams 12. Alternatively, as shown in FIG. 8, only single heat exposing devices 20 of the plurality of the heat exposing devices 20 can be activated, for example only one of the outermost heat exposing devices 20.

Figure 9:
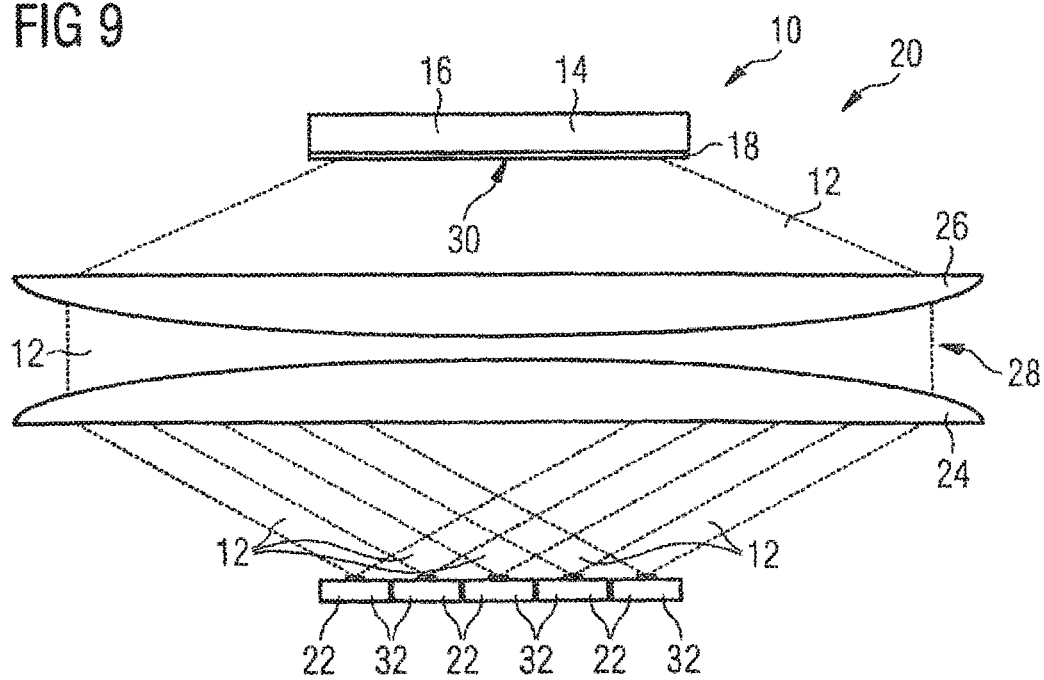
FIG. 9 illustrates an arrangement with a plurality of juxtaposed light sources and one large collimating lens.

FIG. 9 shows a further preferred embodiment of a binder material activating device 10. Here, a plurality of light sources 22 are arranged in juxtaposed positions and each light source 22 emits a light beam 12. One single collimating lens 24 is extending over all light beams 12 and collimates the single light beams 12 into one collimated light beam 12 which is then focused by the focusing lens 26 onto a large area 30 of the fibrous substrate 14. The focusing lens 26 comprises the same extension width as the collimating lens 24.

It can be advantageous if the single light sources 22 emit light beams 12 with differing wavelengths such that the single light beams 12 all impinge the same area 30 of the fibrous substrate 14 and therefore different materials in the fibrous substrate 14 can be activated at the same time.

Figure 10:
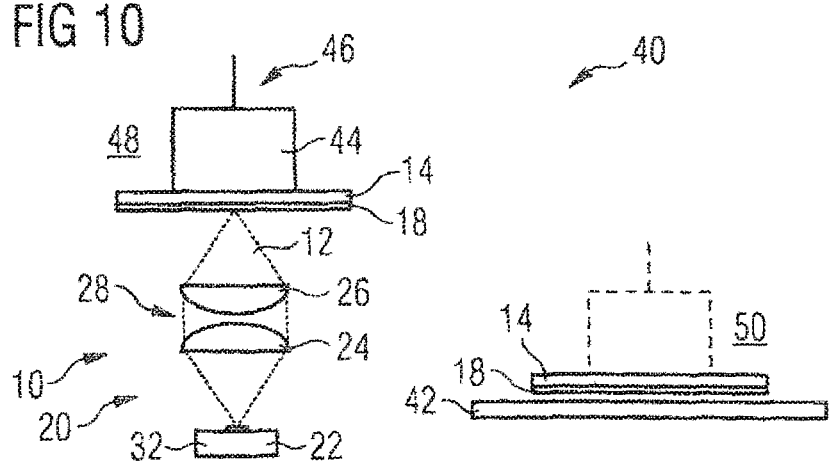
FIG. 10 illustrates a first embodiment of a preforming device comprising a laying head as a laying device.

FIG. 10 shows a first embodiment of a preforming device 40 with which a fibrous substrate 14 can be attached to a preforming substrate 42 whilst activating a binder material 18 on the fibrous substrate 14. The preforming device 40 in FIG. 10 comprises a laying head 44 as laying device 46 for transporting the fibrous substrate 14 from a first position 48 to a second position 50. In case of FIG. 10 the first position 48 is located outside the preforming substrate 42 and the binder material activating device 10 is arranged at this first position 48. The second position 50 is located at the preforming substrate 42.

Figure 11:
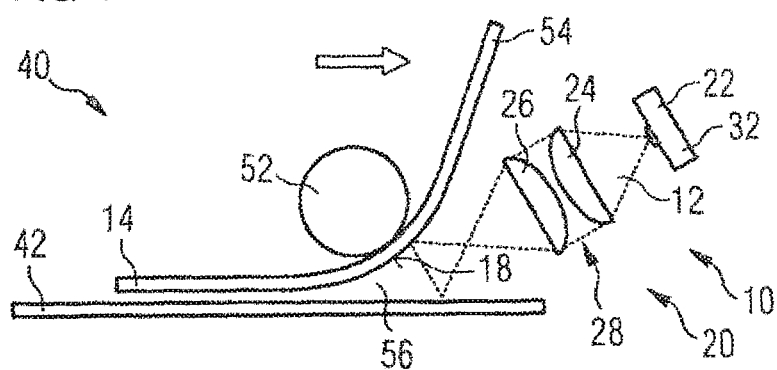
FIG. 11 illustrates a second embodiment of a preforming device comprising a roller as a laying device.

In a second embodiment of a preforming device 40 shown in FIG. 11 a roller 52 is provided which presses a continuous sheet 54 of the fibrous substrate 14 onto the surface of the preforming substrate 42. At a contact point 56 at which the sheet 54 contacts the preforming substrate 42 due to pressing by the roller 52 a focused light beam 12 impinges at least the sheet 54 due to the arrangement of a binder material activation device 10 behind the roller 52 in an inclined state.

Figure 12:
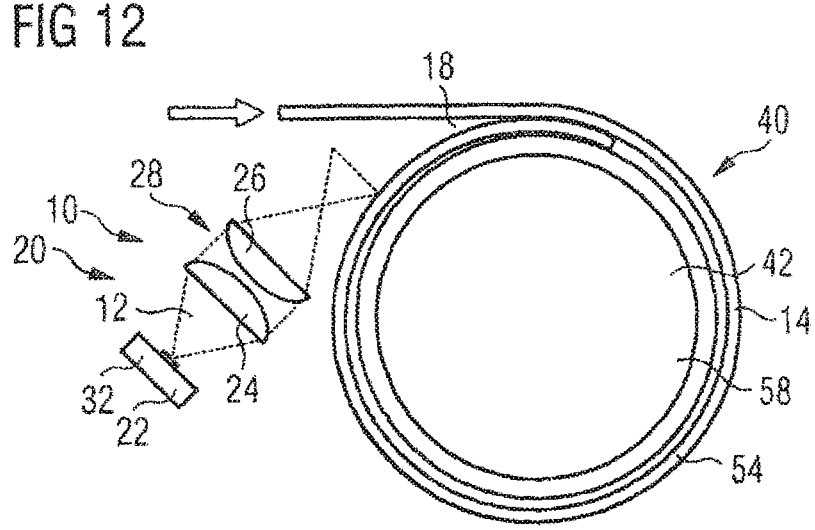
FIG. 12 illustrates a third embodiment of a preforming device comprising a mandrel as the preforming substrate.

In a third embodiment of a preforming device 40 shown in FIG. 12 the preforming substrate 42 is formed by a mandrel 58 and the fibrous substrate 14 formed as a sheet 54 is wound onto the mandrel 58. The binder material activating device 10 is arranged such that the focused light beam 12 impinges the fibrous substrate 14 at a contact point 56 of two subsequent layers of the fibrous substrate 14. Preferably the binder material activating device 10 is arranged in a tangentially manner relative to mandrel 58.

Figure 13:
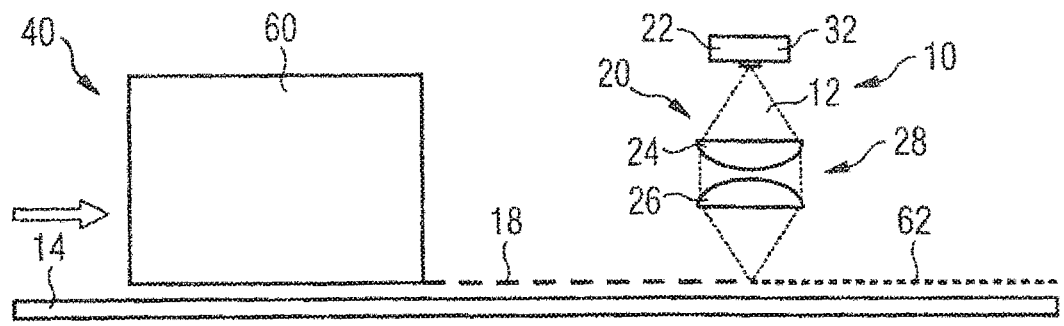
FIG. 13 illustrates a part of the preforming devices of FIG. 10, FIG. 11 and FIG. 12 comprising a binder material deposition device.

FIG. 13 shows a further part of the preforming device 40 with the binder material activating device 10, wherein further a binder material deposition device 60 is provided. Via the binder material deposition device 60 the binder material is deposited onto the fibrous substrate 14 and subsequently activated by the binder material activation device 10 resulting in a layer of activated binder material 62.

Figure 14:
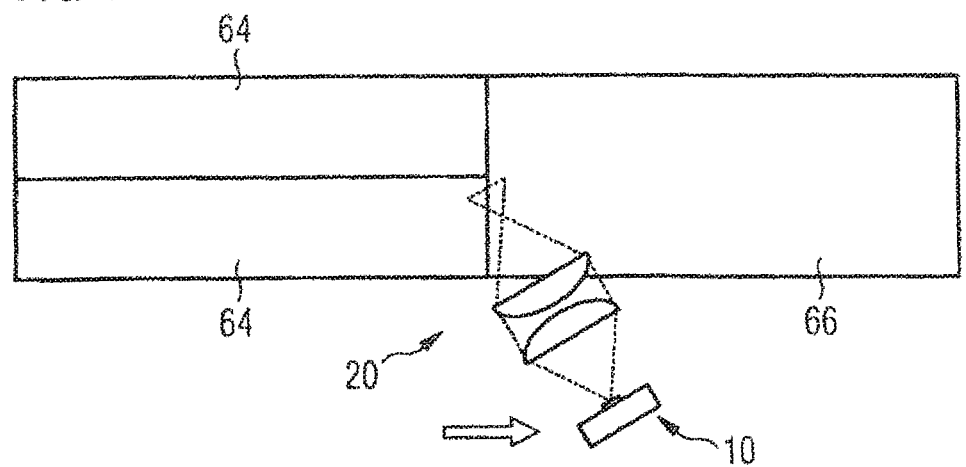
FIG. 14 illustrates merging of two fibrous tapes by a binder material activation device.
Figure 15:
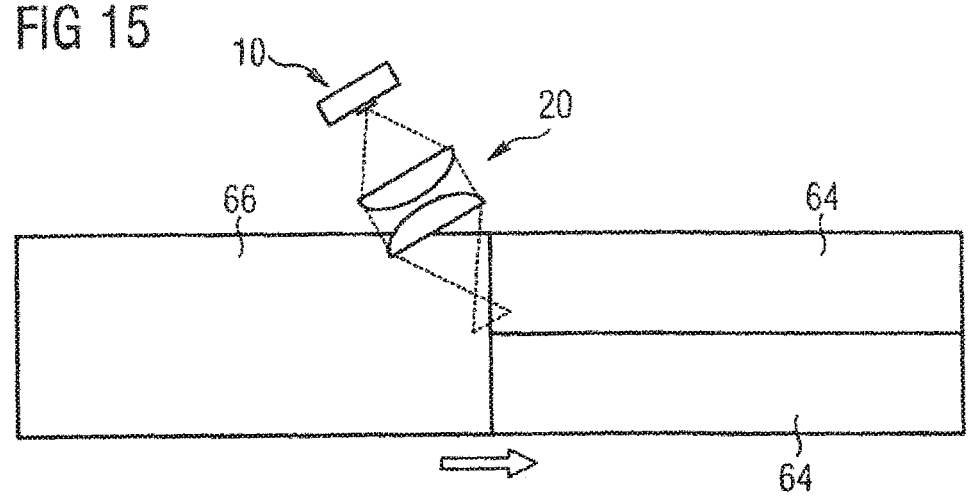
FIG. 15 illustrates separation of a large tape into two narrower tapes by the binder material activating device of FIG. 1.

A further application possibility of the binder material activation device 10 is shown in FIGS. 14 and 15.

As a first possibility a merging of two fibrous tapes 64 to a fibrous sheet 66 is possible. The edges of the fibrous tapes 64 which are located side by side are impinged with a light beam 12 from a binder material activation device 10 such that a binder material 18 on both fibrous tapes 64 is activated and for example melt such that the two tapes 64 can be merged to an overall fibrous sheet 66.

Alternatively, it is also possible to separate the fibrous sheet 66 into two fibrous tapes 64 and using the light beam 12 from the binder material activation device 10 as a cutting device.

The described binder material activation device 10 can be advantageously used in a fiber patch preforming process, for example to manufacture structural parts of, for example, aircrafts.

Binder materials 18 are advantageously activated by heat introduction and therefore the use of focused light sources 22 such as LEDs 32 for heating enable an efficient activation of this binder material 18.

Focused light sources 22 can be easily integrated in some processes because of the contact-free heat transfer with the binder material 18. Further, it is quick and efficient because the energy can be introduced only and exactly where it is required. Such a system can also be much cheaper than a laser solution and induces less safety problems.

The combination of a specific powerful light emission with a lens focusing set-up, namely optics device 28, will enable a highly powered light radiation on the bindered substrate 14 and therefore activation of the binder material 18. All the systems can be adapted to have efficient activation of the binder material 18. Both the light source 22 (regarding power, wavelength, . . . ) and the light image through the lens system 28 can be varied in order to modify the light an therefore the heat introduction and thus can be tuned to introduce efficiently energy where it is required.

Such a heating system built-up with focused light beams 12 has the following assets:
  it is relatively cheap,
  it is easy to integrate into processes as it is contact-free,
  it is flexible and adaptable for specific substrates 14,
  few health and safety issues arise and it can even be in the non-visible spectrum in order to have no issues,
  the system can be target-oriented to heat just some part of the substrate 14.

An advantageous application of such a focused light system is to introduce heat in a flexible way in composite laminates of fiber textiles. The system can work in different wavelengths and can be tailored to be absorbed by only one part of the substrate component. The system can be composed of several sources 22 in order to be able to introduce the aim at different geometrical regions of the substrate 14. The system can also be composed of several sources 22 with different wavelengths so that it can heat different substrates 14. The system is compact, needs few safety protections and can be integrated easily into other systems and/or can easily be transported.

Potential applications are the thermal activation of thermal plastic materials (fiber placement, preform assembly, textile draping, tow binding, tow splitting), heating or curing of thermoset resins, and surface preparation for cured thermosets.

The system is adaptable and the light sources 22 can be parallelized in order to have a light emission focused over a larger surface.

The system can also be parallelized in order to be modular and expose only a specific regions of the substrate 14.

The substrate 14 sometimes is composed of several materials. Given that each material has a different absorption spectrum, the wavelength of the light source 22 can be selected in order to be absorbed principally from one of the materials and therefore introduce the heat in only the target.

For example in a bindered textile heat can be introduced into a fiber 16 or into a binder material 18. A further example is the curing of thermoset/thermoplast impregnated fibers 16 where the heat can be introduced into the fibers 16 or into the resin.

For fiber placement a thermal activation is possible either in a manual or automatic textile layup-process in fiber-patch preforming or when a fiber 16 is wound onto a core. Also potential applications are in other processes like stitching, braiding, knitting or weaving.

Further a thermal activation is possible for a binder fixation. The thermoplastic binder 18 (powder, film or veil) laid on a surface can be activated in order to be impregnated. The binder can also be only locally activated in order tailor its impregnation in the fibers 16 and eventually obtain locally different properties.

A further application is the thermal activation for tape merging or tape separation. The binder material 18 on a unidirectional fiber textile can be melted locally in order to fix several tapes 64 together through this binder material 18, or melted locally in order to separate one tape 66 into several ones.

FIG. 16 depicts a binder material activating device 68 which is similar to the binder material activating device 10. The binder material activating device 68 focuses a light beam 70 onto the fibrous substrate 14. The fibrous substrate 14 is, for example, the fiber 16 coated with the binder material 18.

The binder material activating device 68 comprises a heat exposing device 72 having a divergent light source 74, a collimating lens 76 and a focusing lens 78. The collimating lens 76 and the focusing lens 78 together form an optics device 80. The divergent light beam 70 is first collimated and then focused by the optics device 80 onto the predefined area 30 of the fibrous substrate 14.

In this embodiment, the light source 74 is an LED 82.

The plain or convex collimating lens 76 is arranged such that the light source 74 is disposed in a plain side focus 84 of the collimating lens 76. The collimated light beam 70 is then focused by the focusing lens 78 onto the predefined are 30 where due to focusing of the light beam 70 an energy density is attained which is high enough to activate the binder material 18.

As illustrated in FIG. 17, a binder material activating device 86 is configured to homogenously expose a predefined area 88 of the fibrous substrate 14 to a light beam 90.

The binder material activating device 86 comprises a heat exposing device 92 and an optics device 94.

The heat exposing device 92 has a divergent light source 96, preferably including an LED 98.

The optics device 94 is configured to collimate the light beam 90 and to homogenously expose the area 88 of the fibrous substrate 14 to the light beam 90. The optics device 94 includes a collimating lens 100. The collimating lens 100 is arranged with respect to the light source 96 such that the light source 96 is disposed in the focal plane of the collimating lens 100. Furthermore, the collimating lens 100 has a smaller radius and therefore shorter focal length.

The light source 96, particularly the LED 98, emits a divergent light beam 90 which is collimated by the collimating lens 100. Thereby, the area 88 of the fibrous substrate 14 is nearly homogenously exposed to the light beam.

FIG. 18 shows an arrangement of a plurality of the binder material activating devices 86. The light sources 96 are disposed next to each other and are provided with one collimating lens 100, each. With this arrangement, an area 102 greater than the area 88, e.g. three times larger, than the area 88 can be exposed.

A smaller radius of the collimating lens 100 and the possibility to omit a focusing lens, allow for a more compact objective and reduce loss due to divergence. The arrangement of several binder material activating devices 86, i. e. several light sources 96 next to each other improves homogeneity of the exposure.

Referring to FIGS. 19 and 20, a binder material activating device 104 is similar to the binder material activating device 86. Therefore, only differences of the binder material activating device 104 compared to the binder material activating device 86 will be described in detail. The binder material activating device 104 comprises a heat exposure device 105 with an optics device 106. The optics device 106 is configured to collimate the light beam 90 emitted by the light source 96, particularly the LED 98. The optics device 106 comprises a collimating lens 108 which is preferably a plano-convex lens. The collimating lens 108 is disposed in contact with the light source 96. Thereby, the light yield can be further improved compared to embodiments where the collimating lens is arranged in a distance from the light source. Furthermore, the binder material activating device 104 is more compact than embodiments using two lenses or a lens which is disposed with a distance from the light source. Also there is practically no loss due to divergence.

Similar to the arrangement of several binder material activating devices 86 in FIG. 18, an arrangement of several binder material activating devices 104 exposes a larger area than a single binder material activating device 104 and the homogeneity of the exposure can be improved.

Figure 21:
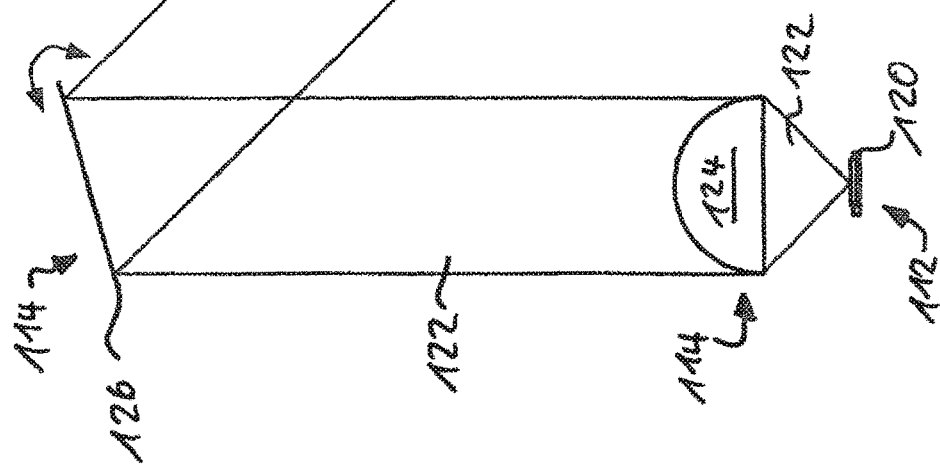
FIG. 21 illustrates a further embodiment of a binder material activating device with a reflecting element in a first state.
Figure 22:
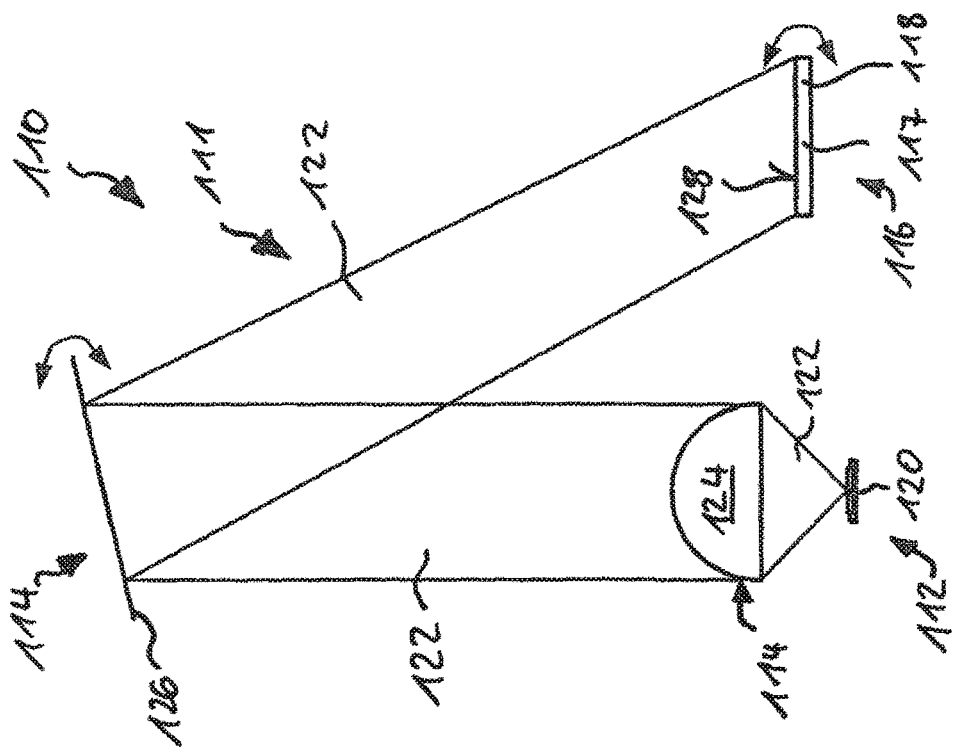
FIG. 22 illustrates the binder material activating device of FIG. 21 in a second state.

Referring to FIGS. 21 and 22, a binder material activating device 110 comprises a heat exposure device 111 with a light source 112 and an optics device 114. The binder material activating device 110 is arranged so as to homogenously expose a fibrous substrate 116, which is comprised of fiber 117 coated with binder material 118.

The light source 112 is preferably an LED 120. The LED 120 emits a divergent light beam 122.

The optics device 114 includes a collimating lens 124, which is e.g. a plano-convex lens. The optics device 114 further comprises a reflecting element 126 configured to reflect the light beam 120.

The reflecting element 126 is configured to reflect the light beam 120. The reflecting element 126 is pivotably (as indicated by the arrows) arranged at the collimated portion of the light beam 122, in order to reflect the light beam 122 onto the fibrous substrate 116.

The fibrous substrate 116 is pivotally (as indicated by the arrows) arranged so that an incident angle of the light beam 122 is adjustable.

The light beam 122 is divergently emitted by the light source 112. The divergent light beam 122 is then collimated by the collimating lens 124 and directed onto the reflecting element. The reflecting element 126 (shown in FIG. 21 in a first state) reflects the light beam 122 coming from the collimating lens 124 towards the fibrous substrate 116. The light beam thereby nearly homogenously exposes an area 128 of the fibrous substrate 116, thereby activating the binder material 118. In FIG. 21, the incident angle α of the light beam 122 is, for example, an acute angle.

In FIG. 22, the reflecting element 126 and the fibrous substrate 116 are pivoted into a state, where the incident angle is roughly zero degrees.

The pivotable elements allow for an exposition of the area 128 by different light sources 112 and/or from different directions as needed and/or desired.

Figure 23:
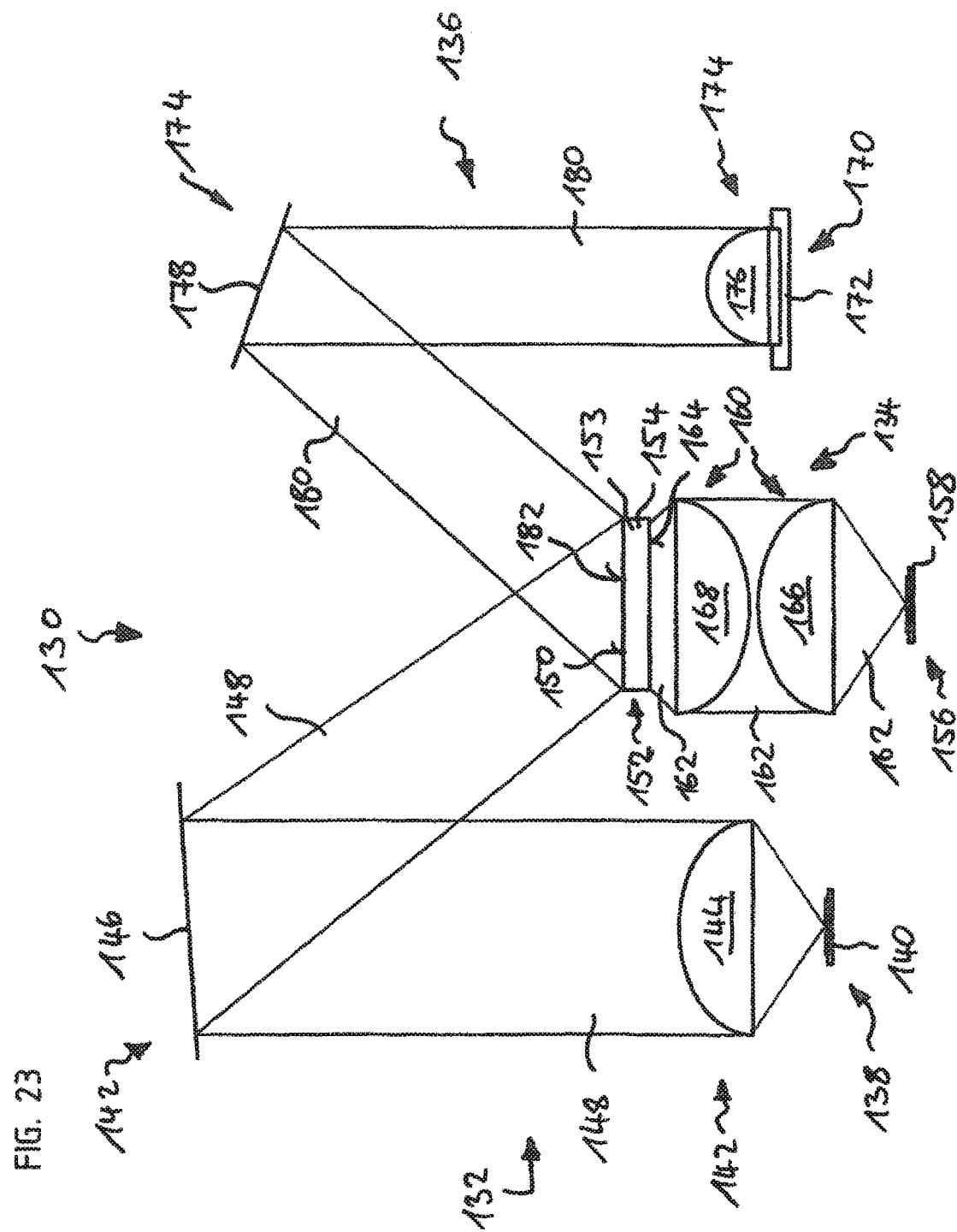
FIG. 23 illustrates a further embodiment of a binder material activating device for bilateral exposure.

Referring now to FIG. 23, a binder material activating device 130 comprises a first heat exposing device 132, a second heat exposing device 134 and a third heat exposing device 136.

The first heat exposing device 132 includes a light source 138, for example an LED 140, having a first wave length. The first heat exposing device 132 further includes an optics device 142 having a collimating lens 144 and a reflecting element 146, e.g. a mirror.

The light source 138 divergently emits a first light beam 148 which is collimated by the first collimating lens 144. The first collimating lens 144 directs the first light beam 148 onto the first reflecting element 146. The first reflecting element 146 which may be pivotable reflects the first light beam 148 onto a first surface 150 of a fibrous substrate 152 comprising fiber 153 covered with a binder material 154.

The second heat exposing device 134 includes a second light source 156, particularly a second LED 158, having a second wavelength. The second heat exposing device 134 further comprises a second optics device 160. The second optics device 160 is configured to focus a second light beam 162 emitted by the second light source 156 onto a second surface 164 of the fibrous substrate 152.

The second optics device 160 includes a second collimating lens 166 and a focusing lens 168.

The second light beam 162 is divergently emitted by the second light source 156 and collimated by the second collimating lens 166. The now collimated second light beam 162 is focused by the focusing lens 168 onto the second surface 164 opposite the first surface 150.

The third heat exposing device 136 comprises a third light source 170, e.g. a LED 172, having a third wavelength.

The second heat exposing device 134 further includes a third optics device 174 having a third collimating lens 176 and a third reflecting element 178.

A third light beam 180 is divergently emitted by the third light source 170. The third light beam 180 is collimated by the third collimating lens 176 which is attached to and in contact with the third light source 170. The collimated third light beam 180 is reflected by the third reflecting element 178 onto a third surface 182 of the fibrous substrate 152.

While in the present embodiment the third surface 182 is identical to the first surface 150, it is also possible for them to be different surfaces. Likewise, the second surface 164 is not necessarily opposite the first or third surfaces 150, 182. Also the areas exposed on the first to third surfaces 150, 164, 182 may be different in size or shape.

As the person skilled in the art will recognize from this disclosure, it is possible for the binder material activating device 130 to employ several and/or different heat exposing devices. This allows exposing different surfaces of the fibrous substrate 152 to be exposed from different directions and/or with different wavelengths as desired and/or needed. The wavelengths may also be the same wavelengths.

Referring now to FIG. 24, a binder material activating device 184 is shown which directs a light beam 186 onto a fibrous substrate 188, for example fiber 190 coated with binder material 192.

The binder material activating device 184 comprises a heat exposing device 194 with a divergent light source 196, e.g. a LED 198, and an optics device 200.

The optics device 200 (this optical device can be for instance an optical fiber mounted directly on the Light emitting source) is configured to direct and/or bundle the light beam 186 divergently emitted by the light source 196 onto a surface 201 of the fibrous substrate 188. The optics device 200 comprises a reflecting element 202 which is for example formed as an open ended cylindrical element 204. The light source 196 is disposed on a first end 206 of the cylindrical element 204. The fibrous substrate 188 is disposed on a second end 208 of the cylindrical element 204. An inner wall portion 210 of the cylindrical element 204 is configured to reflect the light beam 186 onto the fibrous substrate 188, thereby activating the binder material 192.

FIG. 25 depicts a modification of the binder material activating device 184 wherein the reflecting element 202 is formed by a flexible cylindrical element 212 which is preferably made of a plastic material.

Figure 26:
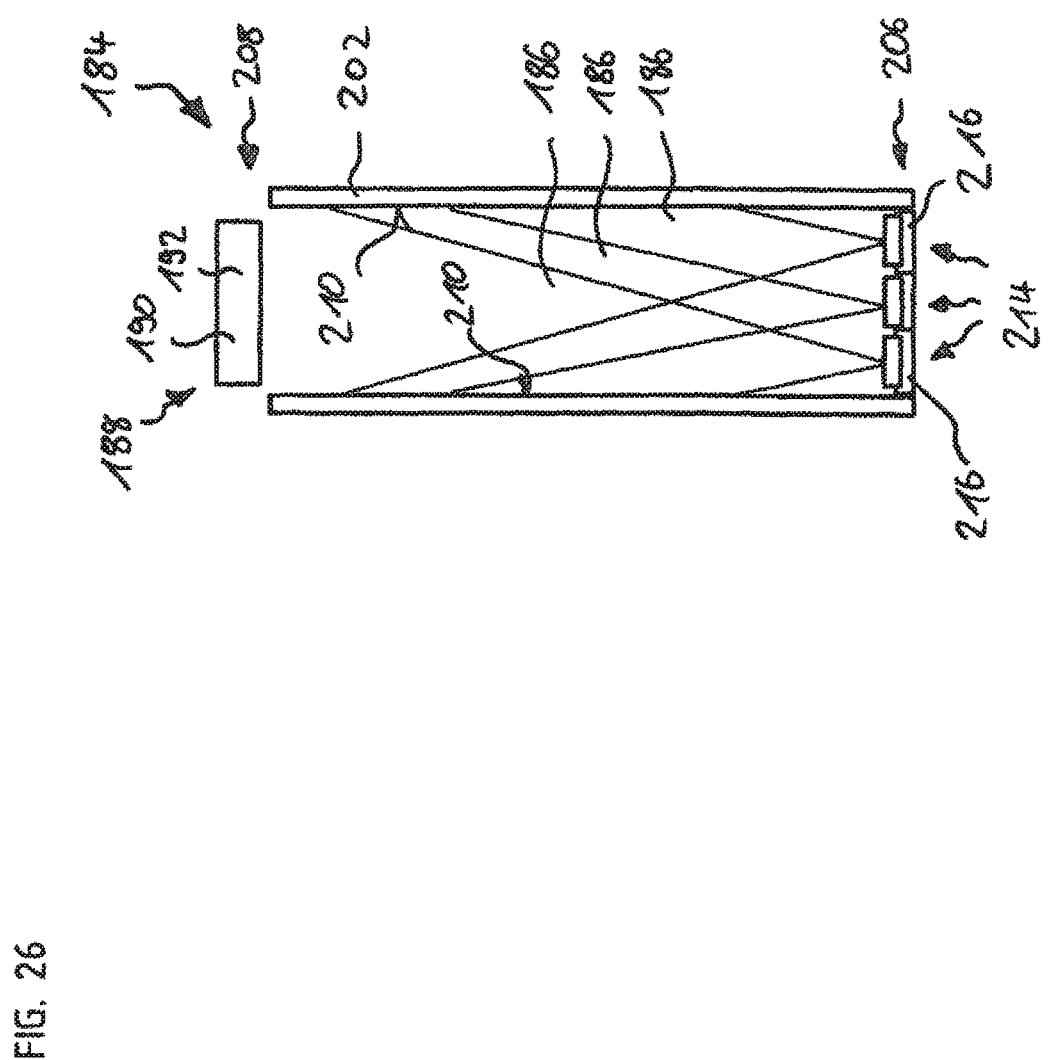
FIG. 26 illustrates a further modification of the binder material activating device of FIG. 24.

FIG. 26 depicts a modification of the binder material activating device 184 wherein three light sources 214 are used instead of one light source 196. The light source 214 preferably includes an LED 216. The reflecting element 202 can be formed by the rigid or the flexible cylindrical elements 204, 212.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST 10 binder material activating device
12 light beam
12a light beam
12b light beam
14 fibrous substrate
16 fiber
18 binder material
20 heat exposing device
20a heat exposing device
20b heat exposing device
22 light source
24 collimating lens
26 focusing lens
28 optics device
30 area
32 LED
34 control device
36 layer
38 matrix
40 preforming device
42 preforming substrate
44 laying head
46 laying device
48 first position
50 second position
52 roller
54 sheet
56 contact point
58 mandrel
60 binder material deposition device
62 activated binder material
64 fibrous tape
66 fibrous sheet
68 binder material activating device
70 light beam
72 heat exposing device
74 light source
76 collimating lens
78 focusing lens
80 optics device
82 LED
84 plain side focus
86 binder material activating device
88 area
90 light beam
92 heat exposing device
94 optics device
96 light source
98 LED
100 collimating lens
102 area
104 binder material activating device
105 heat exposing device
106 optics device
108 collimating lens
110 binder material activating device
111 heat exposing device
112 light source
114 optics device
116 fibrous substrate
117 fiber 118 binder material
120 LED
122 light beam
124 collimating lens
126 reflecting element
128 area
130 binder material activating device
132 first heat exposing device
134 second heat exposing device
136 third heat exposing device
138 first light source
140 first LED
142 first optics device
144 first collimating lens
146 first reflecting element
148 first light beam
150 first surface
152 fibrous substrate
154 binder material
156 second light source
158 second LED
160 second optics device
162 second light beam
164 second surface
166 second collimating lens
168 focusing lens
170 third light source
172 LED
174 third optics device
176 third collimating lens
178 third reflecting element
180 third light beam
182 third surface
184 binder material activating device
186 light beam
188 fibrous substrate
190 fiber
192 binder material
194 heat exposing device
196 light source
198 LED
200 optics device
201 surface
202 reflecting element
204 cylindrical element
206 first end
208 second end
210 inner wall portion
212 cylindrical element
214 light source
216 LED
x spatial direction
y spatial direction
z spatial direction
A axis
B axis

The invention claimed is:

1. A binder material activating device for activating a binder material on a fibrous substrate, the binder material activating device comprising:
   a heat exposing device for exposing the fibrous substrate with the binder material to heat, the heat exposing device comprising:
      a light source comprising a light emitting diode (LED) for providing a divergent light beam; and
      an optics device positioned between the fibrous substrate and the light source,
      wherein the optics device is configured to produce a focused light beam by focusing the divergent light beam onto the fibrous substrate and/or to homogeneously expose the fibrous substrate; and
   a controller for controlling an emission power and emission wavelength of the light source, for controlling a position and an orientation of the heat exposing device about a first axis, and for controlling an orientation of the optics device about a second axis.

2. The binder material activating device according to claim 1, wherein the light source is non-focused.

3. The binder material activating device according to claim 1, wherein the light source comprises an emitting wavelength, in a non-visible spectrum, corresponding to an activation energy needed to activate the binder material and/or corresponding to a heating energy needed to heat at least one fiber in the fibrous substrate to a melting/activating temperature of the binder material.

4. The binder material activating device according to claim 1, wherein:
   the heat exposing device is movable in at least one spatial direction and/or is pivotable about at least one axis perpendicular to the light beam;
   the optics device is movable in at least one spatial direction and/or is pivotable about at least one axis perpendicular to the light beam; and/or
   a unit comprising the heat exposing device and the optics device is movable in at least one spatial direction and/or is pivotable about at least one axis perpendicular to the light beam.

5. The binder material activating device according to claim 1, wherein the optics device comprises:
   a collimating lens configured to collimate the light beam to provide a collimated light beam; and
   a focusing lens configured to focus the collimated light beam onto the fibrous substrate.

6. The binder material activating device according to claim 1, wherein the optics device comprises at least one lens selected from a group of lenses consisting of spherical lenses, aspherical lenses, holographic lenses, and Fresnel lenses.

7. The binder material activating device according to claim 1, comprising:
   a plurality of juxtaposed heat exposing devices; and/or
   at least one heat exposing device with a plurality of light sources, wherein one collimating lens extends over the plurality of light sources.

8. The binder material activating device according to claim 7, wherein the light sources of the plurality of light sources or the plurality of juxtaposed heat exposing devices emit light beams with differing wavelengths and/or differing power.

9. A preforming device to attach a fibrous substrate to a preforming substrate, the preforming device comprising a binder material activating device according to claim 1, wherein the fibrous substrate is configured to be laid onto the preforming substrate by a laying device.

10. The preforming device according to claim 9, wherein the preforming device is configured such that the binder material is deposited onto the fibrous substrate before the binder material is activated by the binder material activating device.

11. The preforming device according to claim 9, comprising a laying head configured to transfer the fibrous substrate from a first position, which is outside the preforming substrate, to a second position, which is on the surface of the preforming substrate, wherein the binder material activating device is arranged at the first position.

12. The preforming device according to claim 9, wherein:
the laying device comprises a roller configured to continuously press a sheet of the fibrous substrate onto the preforming substrate, and
the binder material activating device is arranged to impinge the fibrous substrate and/or the preforming substrate with the focused light beam at a contact point of the fibrous substrate and the preforming substrate.

13. The preforming device according to claim 9, wherein:
the preforming substrate is a mandrel, and
the binder material activating device is arranged to tangentially impinge the focused light beam onto the fibrous substrate as the fibrous substrate is wound onto the mandrel.

14. A method of activating, using a binder material activating device, a binder material on a fibrous substrate, the method comprising:
providing a binder material activating device comprising:
a heat exposing device for exposing the fibrous substrate with the binder material to heat, the heat exposing device comprising:
a light source comprising a light emitting diode (LED) for providing a divergent light beam; and
an optics device positioned between the fibrous substrate and the light source;
laying, using a laying device, the fibrous substrate onto a preforming substrate and the binder material activating device;
controlling an emission power and emission wavelength of the light source, a position and an orientation of the heat exposing device about a first axis, and an orientation of the optics device about a second axis;
focusing, using the optics device, the divergent light beam onto the fibrous substrate and/or homogenously exposing, using the optics device, the fibrous substrate; and
attaching, using the binder material activation device, the fibrous substrate to a preforming substrate.

15. A binder material activating device for activating a binder material on a fibrous substrate, the binder material activating device comprising:
at least one heat exposing device for exposing the fibrous substrate with the binder material to heat, the heat exposing device comprising:
at least one light source comprising a light emitting diode (LED) for providing a divergent light beam; and
an optics device positioned between the fibrous substrate and the at least one light source,
wherein the optics device is configured to produce a focused light beam by focusing the divergent light beam onto the fibrous substrate and/or to homogeneously expose the fibrous substrate; and
a controller for controlling an emission wavelength of the at least one light source.

16. The binder material activating device according to claim 15, wherein the at least one heat exposing device is a plurality of juxtaposed heat exposing devices.

17. The binder material activating device according to claim 16, wherein the at least one light source of each of the plurality of juxtaposed heat exposing devices is configured to emit light beams of differing wavelengths.

18. The binder material activating device according to claim 15, wherein the at least one light source of the at least one heat exposing device is a plurality of light sources.

19. The binder material activating device according to claim 18, wherein the plurality of light sources are configured to emit light beams of differing wavelengths.

20. The binder material activating device according to claim 15, wherein the light source comprises an emitting wavelength, in a non-visible spectrum, corresponding to an activation energy needed to activate the binder material and/or corresponding to a heating energy needed to heat at least one fiber in the fibrous substrate to a melting/activating temperature of the binder material.

* * * * *